(12) United States Patent
Lundberg

(10) Patent No.: US 7,369,701 B2
(45) Date of Patent: May 6, 2008

(54) AUTOMATED DOCKETING SYSTEM

(75) Inventor: Steven W. Lundberg, Edina, MN (US)

(73) Assignee: FoundationIP, LLC, Minneapolis, MN (US)

( * ) Notice: Subject to any disclaimer, the term of this patent is extended or adjusted under 35 U.S.C. 154(b) by 0 days.

(21) Appl. No.: 11/562,334

(22) Filed: Nov. 21, 2006

(65) Prior Publication Data

US 2007/0147680 A1 Jun. 28, 2007

Related U.S. Application Data

(63) Continuation of application No. 10/279,783, filed on Oct. 24, 2002, now Pat. No. 7,142,713.

(51) Int. Cl.
*G06K 9/00* (2006.01)

(52) U.S. Cl. .................. 382/181; 382/209; 382/306

(58) Field of Classification Search ............. 382/181, 382/209, 224, 228, 305, 306, 317, 312; 707/1–9; 715/507, 516
See application file for complete search history.

(56) References Cited

U.S. PATENT DOCUMENTS

| 5,175,681 | A | 12/1992 | Iwai et al. |
| 5,327,115 | A | 7/1994 | Swierczek |
| 5,329,447 | A | 7/1994 | Leedom, Jr. |
| 6,549,894 | B1 | 4/2003 | Simpson et al. |
| 6,859,806 | B1 | 2/2005 | Kamarei et al. |
| 6,970,842 | B1 | 11/2005 | Ashby |
| 2002/0111953 | A1 | 8/2002 | Snyder |

OTHER PUBLICATIONS

"U.S. Appl. No. 10/279,783 Non-Final Office Action mailed Dec. 21, 2005", 9 pgs.
"U.S. Appl. No. 10/279,783 Notice of Allowance mailed Jul. 25, 2006", 7 pgs.
"U.S. Appl. No. 10/279,783 Response to Non-Final Office Action filed Jun. 21, 2006", 10 pgs.

*Primary Examiner*—Daniel Mariam
(74) *Attorney, Agent, or Firm*—Schwegman, Lundberg & Woessner, P.A.

(57) ABSTRACT

The present invention includes a method for docketing an action or event, such as an action or event defined in a form received from the United States Patent and Trademark Office. The method includes scanning the form having written information thereon, the written information comprising a date and indicia defining a docket event, to obtain a scanned image. The indicia on the form defining a docketing event includes a title such as, "Office Action," "Notice of Allowance," "Notice of Missing Parts" and so forth. The date on the form includes, in many embodiments, "Date Mailed." The method also includes processing the scanned image with character recognition logic and identifying the indicia defining the docket event or action and the date on the image.

20 Claims, 2 Drawing Sheets

---

UNITED STATES PATENT AND TRADEMARK OFFICE

| APPLICATION NUMBER | FILING DATE | FIRST NAMED INVENTOR | ATTORNEY DOCKET NO. | CONFIRMATION NO. |
|---|---|---|---|---|
| 09/000,000 | 10/15/2002 | JOHN A. JONES | 1000.001 | 0000 |

| EXAMINER |
|---|
| MAY, MARY J. |

| ART UNIT | PAPER NUMBER |
|---|---|
| 1700 | 1 |

DATE MAILED: 10/20/2002

UNITED STATES PATENT AND TRADEMARK OFFICE

| APPLICATION NUMBER | FILING DATE | FIRST NAMED INVENTOR | ATTORNEY DOCKET NO. | CONFIRMATION NO. |
|---|---|---|---|---|
| 09/000,000 | 10/15/2002 | JOHN A. JONES | 1000.001 | 0000 |

| EXAMINER |
|---|
| MAY, MARY J. |

| ART UNIT | PAPER NUMBER |
|---|---|
| 1700 | 1 |

DATE MAILED: 10/20/2002

*FIG. 1*

AUTOMATED DOCKETING SYSTEM

CROSS REFERENCE TO RELATED APPLICATION(S)

This application is a continuation of U.S. patent application Ser. No. 10/279,783, filed on Oct. 24, 2002 now U.S. Pat. No. 7,142,713, the specification of which is incorporated herein by reference.

The present invention relates to an automated docketing system and to a method for docketing dates.

BACKGROUND OF THE INVENTION

Docketing systems have historically included a calendar and a pencil as components. A lawyer or paralegal or secretary, acting as a docketer, identified a docket event in writing, on an appropriate date designation of the calendar. The docketer typically included reminder notes on the calendar in advance of a docket event. Docket events included dates such as a due date or a bar date or a court date.

The calendar and pencil have largely been supplanted or replaced by software that functions as an electronic calendar. The software includes a library of events that are typically the objects of a docket. The library also includes rules associated with the events. To use the software, a docketer identifies a particular matter, selects an event from the library and enters a significant date into the software. The significant date is one that the docketer desires to associate with the date, for the matter. The docketer enters data by using a keyboard and transferring information from a document to the software. The software activates rules associated with the event to generate significant docket dates. Some docketing software products automatically generate reminder dates in conjunction with the significant docket date. Docketers generate reports using the software. The reports provide a summary of docket dates and events associated with the dates for selected matters.

Docketers typically employ the calendar and pencil as a backup docket system, even though the docketers use the software as a primary system. The dual use insures that important docket dates are not lost.

DESCRIPTION OF THE DRAWINGS

FIG. 1 is a view of a face page of a non-final Office Action from the United States Patent and Trademark Office.

SUMMARY OF THE INVENTION

Figure 2:
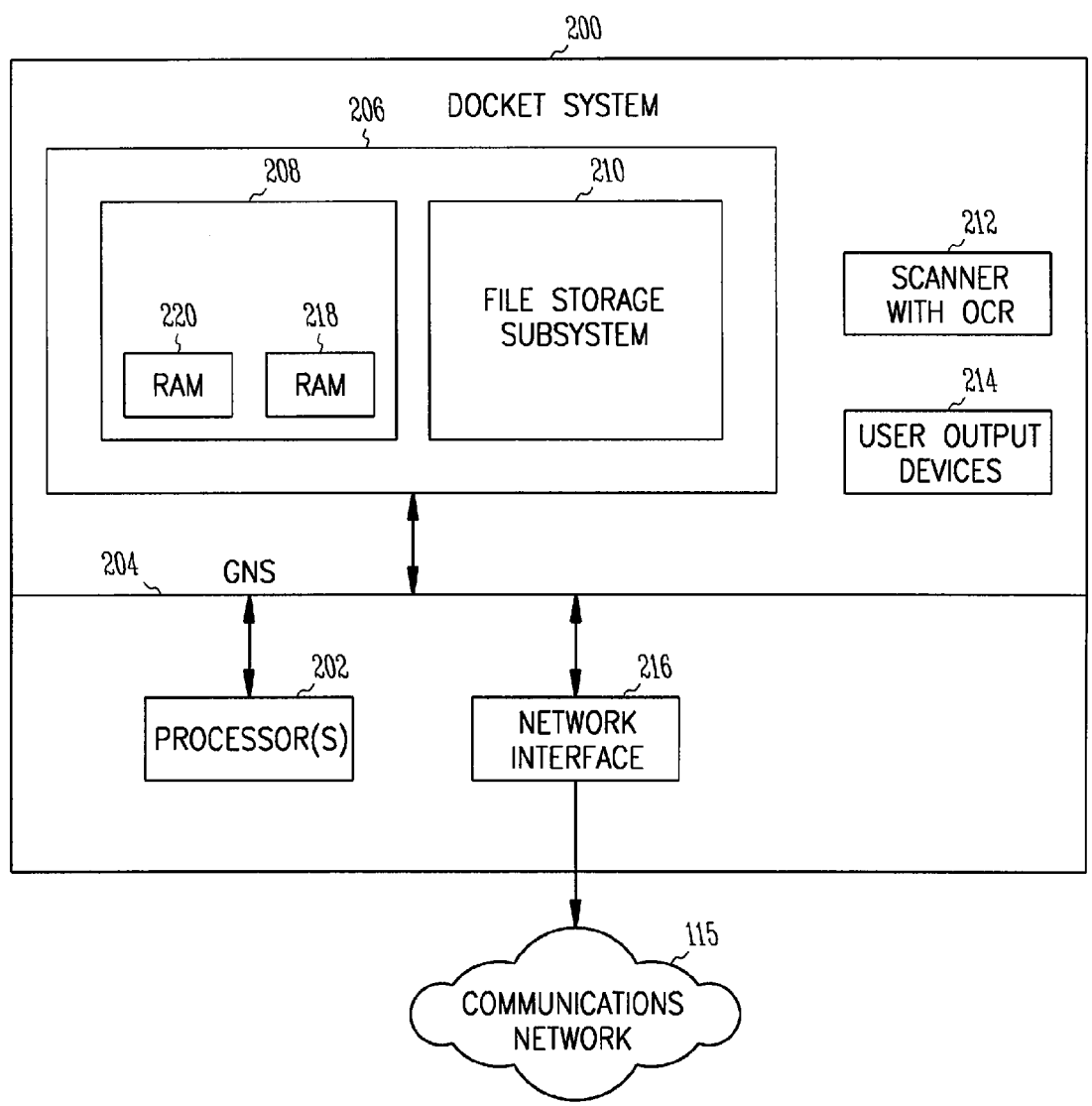
FIG. 2 is a schematic view of one system embodiment of the present invention.

One embodiment of the present invention includes a method for docketing an action or an event. The method includes scanning a sheet having written information thereon, the written information comprising a date and indicia defining a docket event, to obtain an image. The method also includes processing the image with character recognition logic and identifying the indicia defining the docket event and the date within the image. The method further includes providing docketing software that includes a database of docket events and docket rules for the events, wherein at least one event is defined in the image and is recognized with the character recognition logic. The docketing software also includes a field for date input associated with an event. The method includes matching the indicia defining a docket event to the corresponding docket software event in the database and automatically, electronically, entering the date in the image into the field for date input associated with the event. Entering the date prompts the docketing software to generate one or more docket dates based upon rules associated with the event. The docket dates are reported to preselected individuals or roles, along with a copy of the scanned image, and are optionally stored in one or more electronic dockets or case management systems.

Another embodiment of the present invention includes a system for docketing an action. The system includes a mechanism for receiving an image that reports an event and a date wherein the mechanism effectively recognizes the indicia identifying an event and the date. The system also includes docketing software comprising one or more databases of events, rules for each event, a field for entering the event, and a field for date input associated with the event. The system also includes a mechanism for automatically transferring the date image to the docketing software field for date input and matching the indicia identified to a corresponding event in the docketing software and activating the docketing software to generate one or more docket dates and to send a docket report and copy of the scanned image to one or more preselected users.

DETAILED DESCRIPTION

In one method aspect, the present invention includes a method for docketing an action or event, such as an action or event defined in a form received from the United States Patent and Trademark Office or other patent or government office around the world. The method includes scanning the form having written information thereon, the written information comprising a date and indicia defining a docket event, to obtain a scanned image. The indicia on the form defining a docketing event includes a title such as, "Office Action," "Notice of Allowance," "Notice of Missing Parts" and so forth. The date on the form includes, in many embodiments, "Date Mailed." The method also includes processing the scanned image with character recognition logic and identifying the indicia defining the docket event or action and the date within the image.

The method further includes providing docketing software that includes a database of docket events and actions and docket rules for the events and actions, wherein at least one event is defined in the scanned image and is recognized with the character recognition logic. The docketing software provides timely reminders of actions to be taken based upon rules created for performing the actions. The docketing software also includes a field for date input, such as "Date Mailed," that is associated with an event or action. The method includes matching the indicia defining a docket event or action from the scanned image, to the corresponding docketing software event or action in the database by a mechanism such as a tag, and automatically, electronically, entering the date in the scanned image into the field for date input associated with the event. Entering the date prompts the docketing software to generate one or more docket dates based upon rules associated with the event.

In one embodiment, the docket dates generated by the docketing software are reported to preselected individuals or to preselected roles, such as "billing attorney." In one embodiment, a copy of the scanned image is also reported, along with the docket dates. The docket event or action is reported to the preselected individual by e-mail. The scanned image is an e-mail attachment. In one embodiment, the e-mail, optionally with the image attachment, is automatically launched and sent to pre-selected recipients. The docket dates and scanned image are optionally stored in one or more electronic dockets or case management systems.

The form that is scanned includes indicia that identify at least one event or action that requires docketing. The form also includes indicia that identify a date, such as a date mailed. The form additionally includes indicia identifying information such as docket number, serial number, publication number, title, name of a first inventor, name and address of the Applicant, and so forth. The indicia is positioned in the same location for all forms for a particular event or action. The form used in the method of the present invention is not limited to forms prepared and used by the United States Patent and Trademark Office but includes any form that is trademark-related, copyright-related, litigation-related and the like, originating from government or judicial entities, around the world. Forms also include corporate forms with data that requires docketing. Furthermore, while arabic letters and numerical indicia are described herein, any alphabet or numerals are usable in the method of the present invention.

The method includes preparing an electronic image of the form. In one embodiment, the form is scanned to make the electronic image. The electronic image is, in one exemplary embodiment, an Office Action mailed by the United States Patent and Trademark Office, illustrated at 10 in FIG. 1. The image includes a date 12 and indicia defining the event 14. The image also includes indicia defining the matter identity 16, ownership 18 and legal counsel 20.

The method also includes providing a device effective for recognizing the indicia and the date. In one embodiment, the documents are converted to an electronic image in digital form for broadcast over networks, including the World Wide Web, and/or transfer media such as disks or CD-ROM. The conversion includes page decomposition and text recognition, OCR. The documents have a standard form. Thus, page decomposition is performed using methods known by those skilled in the art such as bottom-up, top-down and hybrid decomposition.

The text recognition is performed using optical character recognition document conversion, form-based OCR, or combined image and OCR systems. The form-based OCR is used in at least one embodiment of the present invention because the fields in face pages of correspondence received from the United States Patent Office and many types of government documents are spatially repetitive for all forms of a particular type. Templates are prepared showing the system what a particular form looks like and where to find the fields to read. The location of indicia to be copied and transferred from the form is identified. Error tolerance levels are set on a field level. Thus, an important field, such as a date field and an event field, has a confidence level set to a higher OCR accuracy.

The optical character recognition software and docket software of the present invention interplay so that the mailing date, type of office action and matter identification information are used to create a docketed event. The type of office action, or other type of docket event, is matched to docket rules applicable to the office action or event. The mailing date is entered into the docketing system and is used to generate due dates. The matter identification information is used to match the docket event to a matter and, optionally, matter owner, law firm and attorney.

The method also includes providing docketing software that includes a library of events and rules for each of the events. The docketing software also includes a mechanism for receiving a date input associated with an event. One embodiment of a docketing system, illustrated in simplified block diagram at 200 in FIG. 2 illustrates a docket system that includes at least one processor 202 that communicates with a number of peripheral devices via a bus subsystem 204. These peripheral devices include a storage subsystem 206, comprising a memory subsystem 208 and a file storage subsystem 210, user interface input devices 212, user output devices 214, and a network interface subsystem 216. The input and output devices allow user interaction with the docket system 200. A user is, in specific embodiments, a human user, a device, a process, another computer, and so forth. Network interface subsystem 216 provides an interface to other computer systems and communication networks. The scanner with OCR capability is one user.

Preselected indicia on the image of the form are identified, for some embodiments, copied, and automatically transmitted to the docket system. The indicia are matched and added to appropriate fields defined by the docket system. For instance, indicia for "Final Office Action" are transmitted to a "Final Office Action" field. The date indicia on the form is identified, copied, transmitted and entered into the field for date input associated with the event within the docket system. The rule associated with the event is selected within the docket system. Other identifying indicia, such as docket number, attorney, and so forth are also copied and transmitted to the docketing software. Once the date and other data identifying indicia are entered, the docketing software produces a report of the matter identification, docket number, action identity, and one or more dates by which action must be taken.

In its system aspect, the present invention includes an imaging device capable of creating an electronic image, OCR software capable of identifying preselected fields of the image and, for some embodiments tagging the fields, and interface software capable of transferring indicia in the tagged preselected fields to corresponding fields in docketing software.

In one example, presented to further describe the present invention without limiting the invention, an Office Action is received, by a law firm or company, from the United States Patent and Trademark Office. The Office Action is a form wherein information concerning the type of action, the matter, and the date mailed are presented in the same location, type and position, on the form in one common format for all Office Actions. While a United States Patent Office Action is described, it is understood that any form with information defining a docket event is usable in the present invention. This includes correspondence from patent and trademark offices around the world, as well as correspondence from other government agencies, courts, corporations and law firms.

The Office Action form is rendered into an electronic image when it is scanned using a scanning device. The scanning device includes optical character recognition software. The optical character recognition software recognizes the mailing date, the type of office action, and the matter identification information. The optical character recognition software copies the indicia for mailing date and gives the indicia a tag or address readable by the docketing software. The mailing date indicia is transferred to the docketing system and entered into a field for "mailing date." Similarly, the indicia identifying type of office action and matter identification information is copied and given a tag or address readable by the docketing software. With this interplay between the optical character recognition software and docket software, the mailing date, type of office action and matter identification information are used to create a docket event or action. The transfer of data is performed electronically, without a need for a human being to enter the data by using a keyboard. A docket is generated and sent to users without using a human docketer.

Once the indicia are entered into appropriate fields in the docketing software, the type of office action is matched to docket rules applicable to the office action and has the same effect as would occur if the information were added by typing it into the database. The mailing date is used to generate due dates. The matter identification information is used to match the docket event to a matter and, optionally, matter owner, law firm and attorney or role.

In one embodiment, once an event such as a receipt of an Office Action is docketed, the scanned image of the Office Action and the docketed event are reported to pre-selected individuals using a medium such as e-mail. For some embodiments, the e-mail is auto-generated. The docketed event is added to the pre-selected individuals' docket. The method and system of report-out depend upon the type of docketing system that is used to receive information from the OCR software. The method and system of the present invention are usable with any docket system that receives electronic indicia.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A method for docketing and reporting out an action, comprising:
    providing an electronic image reporting an event, wherein the electronic image includes date indicia and indicia defining the event;
    providing a mechanism effective for recognizing the indicia defining the event and the date indicia on the image;
    identifying the date and indicia defining the event using the mechanism for recognizing the date and indicia;
    providing a first docketing system including a first docketing software that includes a library of events, at least one event being defined in the image, and docket rules for the events, the docketing software further comprising a field for date input associated with the event and fields for event identification;
    automatically transferring the indicia identified in the image to the first docketing software and automatically matching the indicia identified and transferred to corresponding event and date fields in the first docketing software;
    entering the event indicia into the event field of the first docketing software and the date identified into the field for date input associated with the event wherein entering the, date and event indicia prompts the software to generate one or more docket dates of the first docketing system based upon rules associated with the event; and
    reporting the event and electronic image to a second docketing system including a second docketing software and recording the event and generating, with the second docketing system, at least one docket date of the second docketing system, the at least one docket date of the second docketing system associated with the due date.

2. The method of claim 1 and further comprising reporting the event to pre-selected individuals.

3. The method of claim 2 wherein the individuals are pre-selected by individual or by role.

4. The method of claim 1 and further comprising creating and storing a scanned image.

5. The method of claim 4 and further comprising storing the image in a file associated with a legal process.

6. The method of claim 1 wherein the event is related to patent procurement or maintenance.

7. The method of claim 1 wherein the event is related to trademark procurement or maintenance.

8. A system for docketing and reporting out an action, the action identifiable by indicia that are part of an electronic image conveying information regarding the action, comprising:
    a device for generating an electronic image from a form;
    a mechanism effective for recognizing the event and date indicia on the form;
    a first computer including a first docketing software comprising an array of events, at least one event defined by the form, the docketing software further comprising a field for date input associated with an event;
    software for matching and transferring the date and event indicia identified to a corresponding event in the docketing software and for reporting out the electronic image and docketing the event; and
    a second computer including a second docketing software other than the first docketing software, the second docketing computer to receive and record the electronic image and to record the event and to generate at least one docket date based on the date and event indicia.

9. The system of claim 8 wherein the device for creating the electronic image conveying information is a scanner.

10. The system of claim 8 wherein the mechanism effective for recognizing the indicia on the form includes optical character recognition software.

11. The system of claim 8, further comprising reporting the event and electronic image to preselected individuals with the first computer and docketing at least one due date with the second computer at substantially the same time.

12. The system of claim 8, further comprising a third computer to receive the electronic image and the date and event indicia and to transfer the electronic image and the date and event indicia to transfer media.

13. The system of claim 8, wherein the first docketing computer and the second docketing computer are in electrical communication to communicate over the world wide web.

14. A system for docketing and reporting out an action, the action identifiable by indicia that are part of an electronic image conveying information regarding the action, comprising:
- a scanner for generating an electronic image from a form;
- character recognition software effective for analyzing the image and for recognizing date and event indicia of the form;
- a first docketing computer comprising a first docketing software for recording the recognized event indicia and for docketing the recognized date indicia; and
- reporting software for reporting out the date and event indicia and the electronic image from the first docketing computer to an individual user and to further report the date and event indicia to a second docketing computer comprising a second docketing software other than the first docketing software, the second docketing software for recording the event indicia and for docketing the date indicia.

15. The system of claim 14, wherein the first docketing software comprises a first array of events, at least one event defined by the form,
- the first docketing computer includes comparison software for matching the date and event indicia identified by the first docketing software to a corresponding event in the first docketing software and for docketing a due date based on the comparison,
- the second docketing software comprises a second array of events, at least one event defined by the form, and
- the second docketing software includes a second comparison software for matching the date and event indicia identified by the first docketing software to a corresponding event in the second docketing software and for docketing a due date based on the comparison.

16. The system of claim 14 wherein the mechanism effective for recognizing the indicia on the form includes optical character recognition software.

17. The system of claim 14, further comprising reporting out the electronic image and docketing at least one due date occurs at substantially at the same time.

18. The system of claim 14, wherein the first docketing computer and the second docketing computer are in electrical communication to communicate over the world wide web.

19. The system of claim 14, further comprising reporting the event and electronic image to preselected individuals and docketing the event in the second computer at substantially the same time.

20. The method of claim 1, further comprising reporting the event and electronic image to a second docketing system including a second docketing software and recording the event and generating at least one docket date associated with the due date in the second docketing system occurs at substantially the same time.

* * * * *